United States Patent
Guertin et al.

(10) Patent No.: US 7,522,835 B1
(45) Date of Patent: Apr. 21, 2009

(54) METHOD OF TESTING BIT ERROR RATES FOR A WAVELENGTH DIVISION MULTIPLEXED OPTICAL COMMUNICATION SYSTEM

(75) Inventors: Jarod Guertin, Perry Hall, MD (US); Michael J. Ransford, Millersville, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/550,649

(22) Filed: Apr. 17, 2000

(51) Int. Cl.
*H04B 10/08* (2006.01)
*H04B 10/16* (2006.01)
*H04B 10/24* (2006.01)
*H04B 17/00* (2006.01)
*H04J 14/02* (2006.01)

(52) U.S. Cl. .............................. 398/14; 398/11; 398/16; 398/18; 398/22; 398/27; 398/34; 398/37; 398/177

(58) Field of Classification Search ................ 370/333, 370/353; 359/110, 113, 114, 154, 174, 175, 359/176, 177, 178, 179; 455/9; 398/27, 398/177, 10, 1, 26; 714/704, 712, 713, 714, 714/715, 716, 717, 25, 708; 385/24
See application file for complete search history.

(56) References Cited

U.S. PATENT DOCUMENTS

| | | | | |
|---|---|---|---|---|
| 3,934,224 | A * | 1/1976 | Dulaney et al. ................. | 455/9 |
| 4,019,048 | A * | 4/1977 | Maione et al. ................. | 398/155 |
| 4,449,247 | A * | 5/1984 | Waschka, Jr. .................. | 455/9 |
| 4,713,810 | A * | 12/1987 | Chum ........................... | 714/25 |
| 4,998,069 | A * | 3/1991 | Nguyen et al. ............... | 324/539 |
| 5,163,051 | A * | 11/1992 | Biessman et al. ............ | 359/110 |
| 5,172,260 | A * | 12/1992 | Takatsu ....................... | 359/110 |
| 5,315,594 | A * | 5/1994 | Noser .......................... | 370/353 |
| 5,572,352 | A * | 11/1996 | Carbone et al. ............. | 359/177 |

(Continued)

FOREIGN PATENT DOCUMENTS

JP 2000049903 A * 2/2000

OTHER PUBLICATIONS

Newton, Harry. "Channel." Newton's Telecom Dictionary. 13th ed. 1998.*

(Continued)

*Primary Examiner*—Kenneth N Vanderpuye
*Assistant Examiner*—David S Kim
(74) *Attorney, Agent, or Firm*—Clements Bernard PLLC; Christopher L. Bernard; Tyler S. Brown

(57) ABSTRACT

In a wavelength division multiplexed (WDM) optical communication system having optical transmitters and receivers communicating via a optical channels, the bit error rate (BER) for the optical channels is tested simultaneously by performing a BER measurement for the cascaded chain. A BER test signal is supplied from a BER tester to a first optical transmitter. The BER test signal passes through the optical channels. The last optical receiver in the cascaded chain supplies the test signal to the BER tester measure the BER. The measured BER is compared to a predetermined system BER threshold to determine if the optical channels meet their specified BER values. Each optical transmitter and receiver includes a performance monitoring circuit that monitors the quality of the BER signal supplied to the optical transmitter/receiver for identifying one or more optical channels that the measured BER exceeds a predetermined system BER threshold.

5 Claims, 3 Drawing Sheets

U.S. PATENT DOCUMENTS

| | | | | |
|---|---|---|---|---|
| 5,585,954 | A | * | 12/1996 | Taga et al. .................... 398/26 |
| 5,717,510 | A | * | 2/1998 | Ishikawa et al. ............ 398/199 |
| 5,764,651 | A | * | 6/1998 | Bullock et al. .............. 714/708 |
| 6,115,157 | A | * | 9/2000 | Barnard et al. ................. 398/1 |
| 6,215,565 | B1 | * | 4/2001 | Davis et al. ................. 359/110 |
| 6,229,631 | B1 | * | 5/2001 | Sato et al. .................... 359/110 |
| 6,351,322 | B1 | * | 2/2002 | Ransford et al. ............ 359/110 |
| 6,438,717 | B1 | * | 8/2002 | Butler et al. ................ 714/704 |
| 6,606,354 | B1 | * | 8/2003 | Bach et al. ................... 375/224 |
| 7,181,138 | B1 | * | 2/2007 | Gerstel et al. ................. 398/33 |

OTHER PUBLICATIONS

Green, P.E. et al. "WDM protocol-transparent distance extension using R2 remodulation." IEEE Journal on Selected Areas in Communications, vol. 13, No. 5, Jun. 1996: 962-967.*

"Optical and DWDM Testing with the T-BERD 310." Apr. 2000. TTC. Dec. 10, 2005 <http://www.livingston.co.uk/fileadmin/downloads/uk/PDFs/tb310dwdan.pdf>.*

"Test Results: Juniper Networks M40 Internet Backbone Router Inter-operating with the CIENA MultiWave Sentry DWDM System." Mar. 1999. Juniper Networks. Dec. 10, 2005 <http://www.juniper.net/solutions/literature/interoperability/ciena-mar99/interop.pdf>.*

Hoogerbrugge, M. "Optimizing test strategies for SONET/SDH/ATM network element manufacturing." International Test Conference, 1995. Proceedings. Oct. 21-25, 1995: 973-978.*

Bergano, N.S. et al. "Margin measurements in optical amplifier systems." IEEE Photonics Technology Letters, vol. 5, No. 3, Mar. 1993: 304-306.*

"Test Results: Juniper Networks M40 Internet Backbone Router Inter-operating with the CIENA MultiWave Sentry DWDM System." Jan. 11, 1999 (the search for the publication date and the confirmation of the publication date are also included).*

* cited by examiner

METHOD OF TESTING BIT ERROR RATES FOR A WAVELENGTH DIVISION MULTIPLEXED OPTICAL COMMUNICATION SYSTEM

BACKGROUND OF THE INVENTION

1) Field of the Invention

This invention pertains to the field of wavelength division multiplexed optical communication systems and, more particularly, to method of performing bit error rate tests for a wavelength division multiplexed optical communication system having a plurality of optical communication channels.

2) Background of the Related Art

Optical devices are increasingly being used in communication and information systems. An optical communication system, as used herein, refers to any system which uses optical signals to convey information across an optical waveguiding medium, such as an optical fiber. Examples of such systems include, but are not limited to, telecommunications systems, cable television systems and local area networks (LANs).

In the past, optical communication systems were designed to communicate data on an optical fiber via an optical communication channel having a single wavelength. To convey information to and from multiple sources and/or destinations, time division multiplexing (TDM) was frequently employed to share the single-wavelength channel. If multiple communication channels were desired, multiple fibers could be used.

More recently, wavelength division multiplexing (WDM) has been employed in optical communication systems to increase the information capacity of existing fiber networks. A WDM optical communication system employs multiple optical communication channels in a single fiber, each channel carrying a different optical signal operating on a different optical wavelength and transmitted over a single optical waveguide, or fiber.

As the demand for communications has increased, WDM optical communication systems are being developed with more and more optical communication channels. There are now WDM systems which have 80-100 separate optical communication channels each operating on a different optical wavelengths on a single optical fiber.

One standard measure of the quality of an optical communication system is the specified bit error rate (BER) for an optical communication channel in the system.

FIG. 1 shows a prior art arrangement for testing the BER for an exemplary optical communication system comprising two optical communication network elements 105, 107. Each optical communication network element 105, 107 comprises N optical transmitters 120 and N optical receivers 130 for communicating over N optical communication channels. Each optical communication channel has a specified BER value. If the BER for an optical communication channel is greater than the specified BER value, then the optical transmitter/receiver pair 120/130 for that optical communication channel is not within specification and corrective measures are in order. A BER tester 140 is used to measure the BER for each optical communication channel to test whether or not the BER is within specification. Typically, the BER tester 140 comprises a BER test signal generator and a BER detector.

To test the BER for an optical communication channel, i, the BER test signal generator is connected to the optical transmitter 120 $Tx_i$ of the first optical communication network element 105. The output of the optical transmitter $Tx_i$ is connected via an optical waveguide or optical fiber 115 to the corresponding optical receiver $Rx_i$ of the second optical communication network element 107. The output signal from the optical receiver 130 $Rx_i$ of the second optical communication network element 107 is provided to the BER detector in the BER tester 140.

The BER test signal generator of the BER tester 140 supplies a BER test signal to the optical transmitter 120 $Tx_i$ of the first optical communication network element 105. The BER detector receives the BER test signal from the optical receiver 130 $Rx_i$ of the second optical communication network element 107 and detects and counts any bit errors produced by passing the BER test signal through the optical communication channel i to produce a measured BER for the optical communication channel i. Finally, the measured BER for the optical communication channel i is compared against a specified BER value for the optical communication channel to determine whether or not the optical communication channel i is within specification.

To test BER for the WDM optical communication system, the optical communication channel BER test is repeated for each optical communication channel i, in the optical communication system, where $i \in (1, N)$. If the measured BER for each of the optical communication channels is less than the specified BER value, then the optical system meets its BER requirements and passes the BER test. If one or more of the optical communication channels has a measured BER which is greater than the specified BER value, then corrective measures are required, including troubleshooting and repairing the optical transmitter/receiver pair 120/130 for the optical communication channels which failed the BER test.

The above-described prior art method works well when the number of optical communication channels is small and the specified BER values are relatively large.

However, there is a problem in testing a WDM optical communication system having many optical communication channels, each operating with a low specified bit error rate. To accurately and reliably measure a bit error rate for an optical communication channel, it is generally considered necessary to communicate enough data through the optical communication channel so that, at the specified BER, an average of ten errors will be produced. As technology has improved, WDM optical communication systems with lower and lower specified BERs are being produced. WDM optical communication systems have been developed which specify an optical communication channel BER of less than 10E-15.

Accordingly, to measure the BER for an optical communication channel having a specified BER is 10E-15, it is necessary to communicate at least 10E16 bits through the channel, which will on average produce ten errors. In a WDM optical communication system specifying an optical communication channel BER of less than 10E-15 and a data rate of 2.5 Gbps, the BER measurement for a single optical communication channel takes more than 46 days. In the case of a WDM optical communication system having forty (40) optical communication channels each having a specified BER of less than 10E-15 at a specified data rate of 2.5 Gb/s, it would take over 5 years to test the BER for the entire system, if each channel is tested sequentially in time. Clearly, a test taking so long is completely unacceptable.

Alternatively, it is possible to use 40 separate BER testers to test the 40 optical communication channels in parallel at the same time. However, the BER testers are somewhat expensive, and this approach is very costly.

Accordingly, it would be advantageous to provide an improved method of testing BER for a WDM optical communication system having a plurality of optical communication channels. It would also be advantageous to provide such a method wherein when one or more of the optical communication channels has an actual BER which exceeds a specified BER value, those optical communication channels are identified so that the optical transmitter(s) and/or optical receiver(s) for those optical communication channels can be troubleshot and repaired. Other and further objects and advantages will appear hereinafter.

SUMMARY OF THE INVENTION

The present invention is therefore directed to a method of testing the bit error rate (BER) for a plurality of optical communication channels in a wavelength division multiplexed (WDM) optical communication system which substantially overcomes one or more of the problems due to the limitations and disadvantages of the related art.

It is an object of the present invention to provide a quick method of determining whether the BER is acceptable.

It is another object of the present invention to provide an inexpensive method for determining whether the BER is acceptable.

It is yet another object of the present invention to be able to determine which channel(s) gives rise to an unacceptable BER.

These and other objects may be realized by performing a BER measurement for a WDM optical communication system which has been cascaded, and, when the BER measurement is unacceptable, determining the faulty channel(s) using an on-board performance monitor for each channel.

In one aspect, the optical transmitters and receivers for "N" optical communication channels within a WDM optical communication system are connected together in a chain to form a single continuous communication path, and a system BER measurement is performed. A BER signal generator is connected to the input of the first optical transmitter in the single continuous communication path, and a BER detector is connected to the output of the last optical receiver for the last optical communication channel in the single continuous communication path. The BER for the single continuous communication path is measured and compared with a predetermined system BER threshold. If the measured BER is less than the predetermined system BER threshold, then each of the optical communication channels meets its specified BER value and the WDM optical communication system passes the system BER test.

In another aspect, when the measured BER for the single continuous communication path is greater than the predetermined system BER threshold, one or more optical communication channels whose actual BER exceeds its specified BER value are identified using on-board diagnostic circuits included in the optical transmitters and optical receivers in the WDM optical communication system.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

Figure 1:
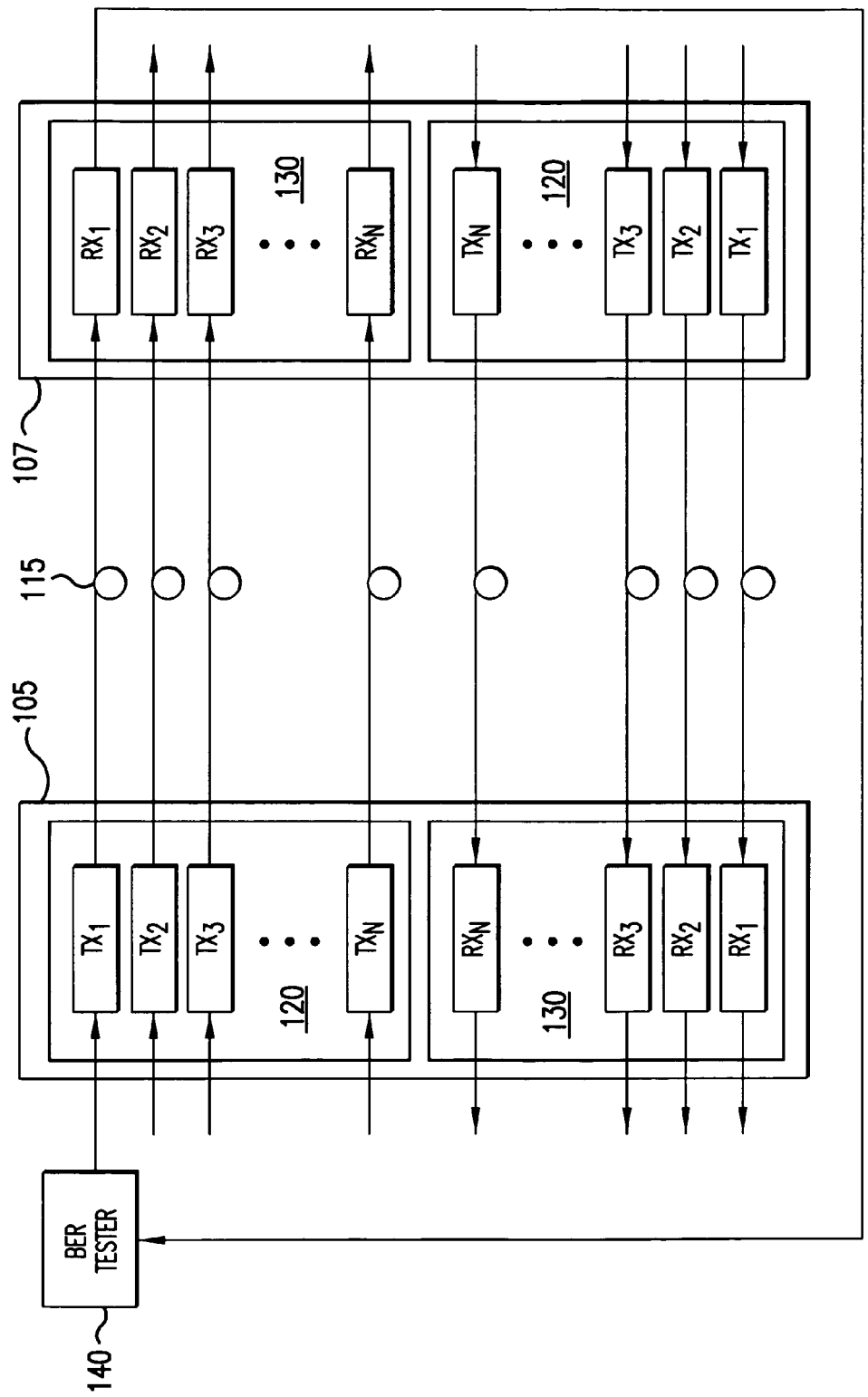
FIG. 1 shows a prior art arrangement for testing the bit error rate for a WDM optical communication system.
Figure 2:
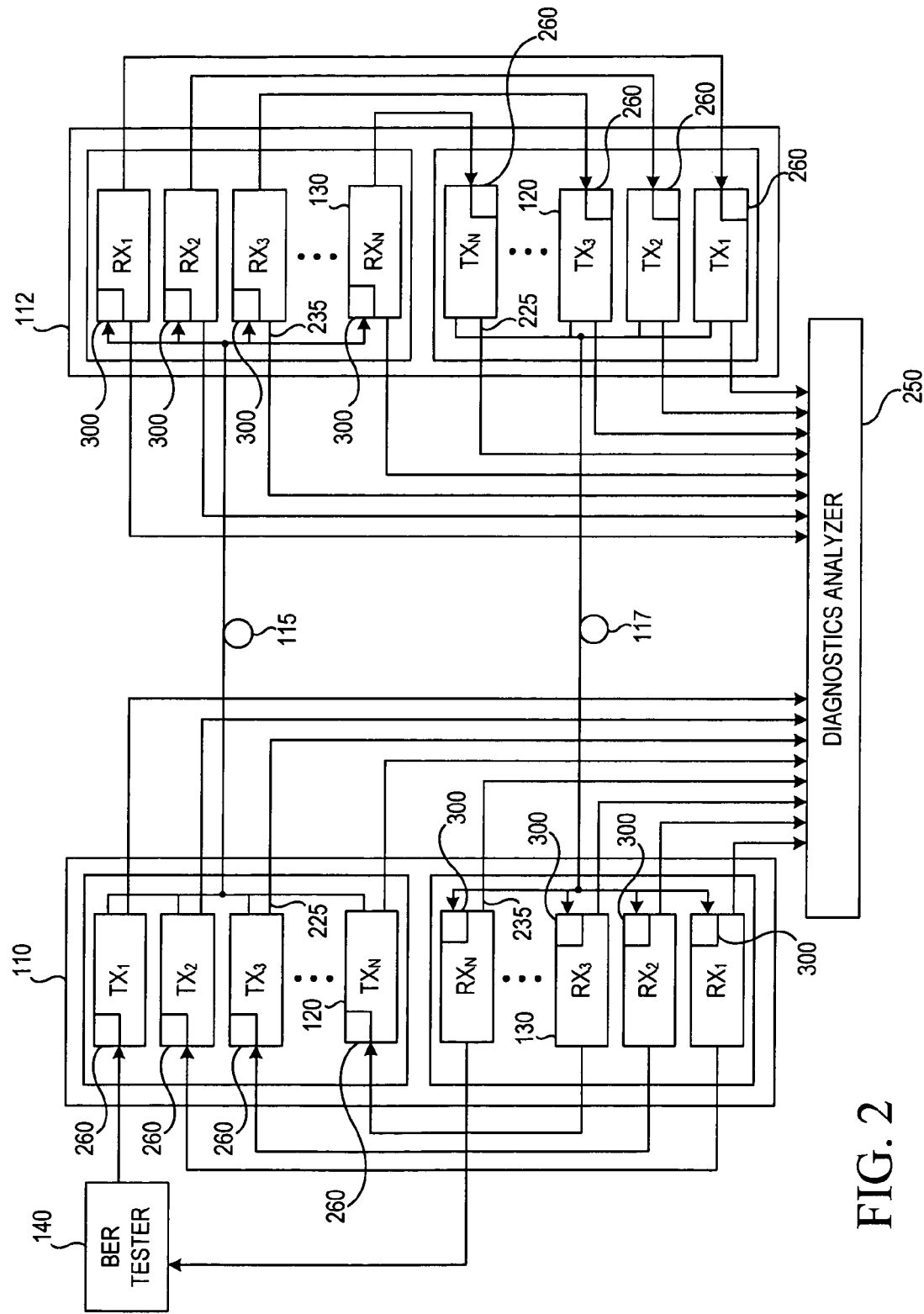
FIG. 2 shows a preferred embodiment of an arrangement for testing the bit error rate for a WDM optical communication system according to the present invention.

A preferred arrangement for testing the BER for optical communication channels in a WDM optical communication system is shown in FIG. 2.

The WDM optical communication system shown in FIG. 2 comprises two optical communication network elements 110, 112 each comprising a plurality of optical transmitters 120 and optical receivers 130. In a preferred embodiment, each of the optical communication network elements 110,112 comprises N optical transmitters 120 and N optical receivers which communicate data over N forward optical communication channels, from the first optical communication network element 110 to the second optical communication network element 112, and N return optical communication channels, from the second optical communication network element 112 back to the first optical communication network element 110, on a pair of optical fibers 115,117 respectively.

A single BER tester 140 is used to test BER for the optical communication system. The BER tester 140 comprises a BER test signal generator and a BER detector. In a preferred embodiment, the BER tester is a synchronous optical network (SONET) BER tester. The BER test signal generator generates a BER test signal for testing the BER of an optical communication channel. Typically, the BER test signal will comprise a psuedorandom bit stream (PRBS). Preferably, the BER test signal generator formats the PRBS into a series of SONET packets which comply with standardized formatting protocols.

As shown in FIG. 2, all of the optical communication channels are connected together with each other in a cascaded arrangement to form a single continuous communication path from the input of a first optical transmitter 120, $Tx_1$, of the first optical communication network element 110, to the output of a last optical receiver 130, $Rx_N$, of the first optical communication network element 110. The BER test signal generator of the BER tester 140 is connected to, and supplies the BER test signal to, the first optical transmitter 120, $Tx_1$, of the first optical communication network element 110. The BER test signal passes through the single continuous communication path comprising the cascaded arrangement of all of the N forward optical communication channels and the N return optical communication channels. The BER test signal is then supplied from the output of the last optical receiver 130, $Rx_N$, of the first optical communication network element 110 to the BER detector of the BER tester 140.

The BER detector detects and counts a number of errors in the received BER test signal which were produced by passing the BER test signal through all of the forward and return optical communication channels in the WDM optical communication system. Thereby, the BER tester 140 generates a measured BER for the single continuous communication path comprising a cascaded arrangement of all of the forward and return optical communication channels in the WDM optical communication system.

Each optical communication channel in the WDM optical communication system has a specified BER value. If the actual BER for the optical communication channel is greater than this specified BER value, then the optical transmitter/ receiver pair 120/130 for that optical communication channel is not within specification and corrective measures are in order. Since the cascaded system will be carrying the errors all the way through, with no way of determining where an error occurred, detection of an error in excess of the minimum error will result in diagnostic testing for the cascaded system to determine the potentially unsatisfactory communication path.

Even using such a cascaded system and even assuming a transmission rate of 2.5 Gbps, it would take too long, i.e., 4.6 days to measure a very low bit error rate e.g., 1E-15 or 1E-14. In accordance with the present invention, the bit error rate testing for such low bit error rates is to occur over a shorter time period, e.g., 40,000 seconds, than would be required to determine the actual bit error rate, and it is to be assumed that no errors are to be allowed over this shorter time period. Thus, for the system, if even a single error is detected by the bit error rate tester 140 testing for very low bit error rates, it is necessary to identify the optical communication channel(s) in which the error(s) occur so that corrective measures may be taken, including troubleshooting and repairing the corresponding optical transmitter/receiver pair(s) 120/130.

Accordingly, as shown in FIG. 2, each optical transmitter 120 and optical receiver 130 includes an on-board diagnostic circuit for monitoring the quality of the signal received by the corresponding optical transmitter 120 or optical receiver 130. For each optical transmitter 120, the on-board diagnostic circuit provides a transmitter diagnostic output signal 225 indicating a signal quality for the signal received by the corresponding optical transmitter 120. For each optical receiver 130, the on-board diagnostic circuit provides a receiver diagnostic output signal 235 indicating a signal quality for the signal received by the corresponding optical receiver 130. Each transmitter diagnostic signal 225 and receiver diagnostic signal 235 indicates a number of bit errors present in the signal received by the corresponding optical transmitter 120 or optical receiver 130.

That is, each transmitter diagnostic signal 225 and receiver diagnostic signal 235 indicates a number of bit errors which were produced by that portion of the single continuous communication path in the WDM optical communication system from the first optical transmitter, $Tx_1$, of the first optical communication network element 110 up to and including the output of the corresponding optical transmitter 120 or optical receiver 130, respectively. Each of the transmitter diagnostic output signals 225 and receiver diagnostic output signals 235 are provided to a diagnostic analyzer 250, which may include a computer processor.

While this simultaneous BER testing allows determination of an acceptable overall BER, it will not indicate which channel(s) are faulty when the system BER is unacceptable. Since the WDM system is not cascaded in operation, when the BER is unacceptable, the individual channel(s) giving rise to the BER must be ascertained and corrected.

Accordingly, when the measured system BER for the WDM optical communication system exceeds the predetermined BER threshold for any of the communication channels, the diagnostics analyzer 250 analyzes the transmitter diagnostic output signals 225 and receiver diagnostic output signals 235 from each optical transmitter 120 and optical receiver 130 in the WDM optical communication system. The diagnostics analyzer 250 identifies which optical communication channel(s) are unsatisfactory by determining where excessive bit errors were detected by the on-board diagnostic circuits in the optical transmitters 120 and optical receivers 130 in the cascaded chain of optical communication channels.

By this method, the optical communication channel(s) which are not within specification are identified so that corrective measures may be taken.

Figure 3:
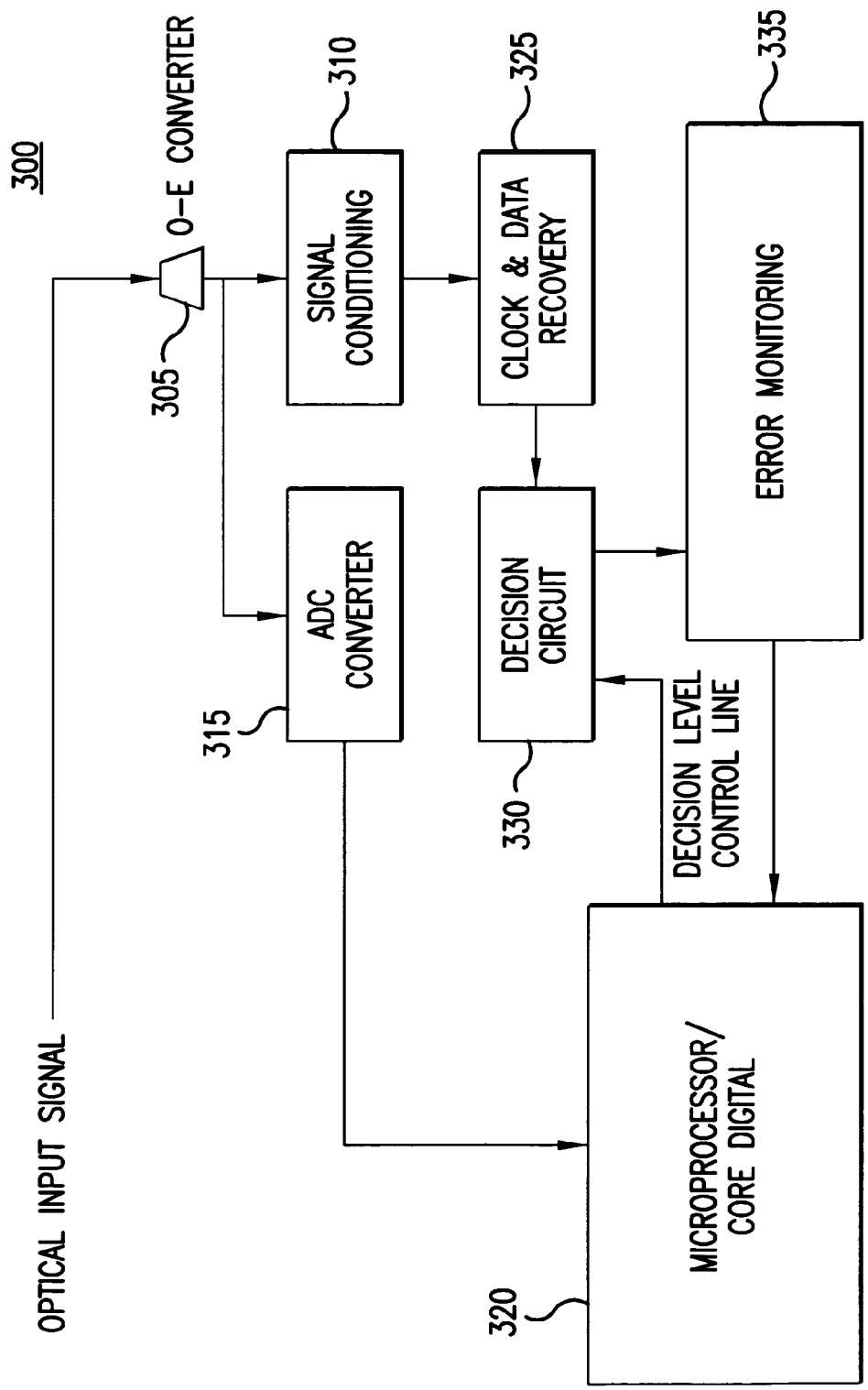
FIG. 3 shows a block diagram of an on-board performance monitor for an optical receiver or an optical transmitter in a WDM optical communication system.

FIG. 3 shows block diagram of a preferred embodiment of an internal performance monitor 300 as the on-board diagnostic circuit for an optical transmitter 120 and optical receiver 130 which may be used in a BER testing method according to the present invention.

When the network is in SONET format, several bytes in the SONET frame overhead are reserved for a method of error monitoring called Bit Interleave Parity (BIP). Each SONET frame carries the BIP of the previous frame. The internal performance monitor 300 calculates the parity of every frame and compares this parity with the parity stored n the next frame received. If the parities are different, the internal performance monitor 300 assumes there is a bit error. Rather than calculate whether an error occurs for each bit, it is assumed that the system being monitored is prone to random errors, not bursts of errors. Since only parity is being monitored, if an even number of errors occurs, the parity will remain the same, resulting in a false positive. However, checking only parities allows checking for errors without knowledge of the bit pattern being sent by the tester.

As can be seen in FIG. 3, the internal performance monitor 300 includes an optical-to-electrical (O-E) converter 305, a signal conditioning unit 310, an analog-to-digital converter (ADC) 315, a microprocessor 320, a clock and data recovery unit 325, a decision circuit 330 and an error monitoring unit 335.

The O-E converter 305 converts the input optical signal into an electrical signal. This signal is then output to the signal conditioning unit 310 and the ADC 315. The ADC 315 converts the analog signal from the O-E converter 305 into a digital signal which is then forwarded to the microprocessor 320. The signal conditioning unit 310 takes the output from the O-E converter 305 and converts it into a form the clock and data recovery unit 325 desires. The clock and data recovery unit 325 separates the clock signal and BIP data from the overhead information and forwards them to the decision circuit 330. The decision circuit also receives the digital signal from the microprocessor 320.

Since, as noted above, each SONET signal carries the BIP of the previous frame, when a frame is received its actual BIP is calculated and saved as the received BIP in the microprocessor 320. When the next frame is received, the BIP stored therein is recovered by the clock and data recovery unit 325. The microprocessor 320 supplies the received BIP and the clock and data recovery unit supplies the stored BIP to the decision circuit 330. If there is a difference, a counter in the error monitoring unit 335 is incrementally increased. The output from the error monitoring unit is supplied to the diagnostic analyzer 250 in FIG. 2.

In addition to the bit error rate, the quality or Q of the system may be monitored by adjusting the decision level threshold provided by the microprocessor 320 to the decision circuit 330.

Referring to FIG. 2, the internal performance monitors 300 are configured on each optical receiver 130. Further internal performance monitors 260 are configured on each optical transmitter 120. The internal performance monitors 260 operate similar to the internal performance monitors 300, except for converting an electrical signal into an optical signal. The internal performance monitors 260 and 300 are actually employed in the system everywhere a signal goes from being optical to electrical back to being optical, i.e., the performance monitor is included to check the electrical signal. In a preferred embodiment of the system, this results in the internal performance monitors 260 and 300 actually being employed in two places for each channel in the system. As can be seen in FIG. 2, each input signal is tested by the internal performance monitors 260 and 300.

For a simple example, assume there are only two channels. The performance monitors 260 and 300 receive the following inputs:

Input to Tx1 in optical communication network element 112

Input to Rx1 in optical communication network element 110

Input to Tx1 in optical communication network element 110

Input to Rx1 in optical communication network element 112

Input to Tx2 in optical communication network element 112

Input to Rx2 in optical communication network element 110

Input to Tx2 in optical communication network element 110

Input to Rx2 in optical communication network element 112

According to the above-described method, simultaneous testing of the BER for the entire WDM optical communication system may be realized, regardless of how many optical communication channels it has. Thus, in the case where a WDM optical communication system has many channels (e.g. 80), the time required to perform the BER test for the WDM optical communication system is substantially reduced from the prior art method wherein all of the optical communication channels were tested sequentially. Moreover, since only a single BER tester 140 is required, a substantial cost savings is achieved over the prior art method wherein all of the optical communication channels were tested simultaneously using many BER testers.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the concept and scope of the appended claims.

What is claimed is:

1. A system for testing optical communication channels for wavelength division multiplexed optical communication, comprising:
    a first set of optical transmitters and optical receivers at a first site:
    a second set of optical transmitters and optical receivers at a second site:
    optical fibers between the first site and the second site, wherein the first set of optical transmitters are connected to the second set of optical receivers over a first optical fiber, and wherein the second set of optical transmitters are connected to the first set of optical receivers over a second optical fiber;
    wherein each of the first set and the second set is configured in a cascaded configuration to define a single continuous communication path from an input of a first optical transmitter to an output of a last optical receiver through all the optical transmitters and all the optical receivers in the first set at the first site and in the second set at the second site and through the optical fibers;
    a bit error rate tester to generate a bit error rate test signal, wherein the bit error rate test signal is transmitted over the single continuous communication path;
    a performance monitor in each of the optical transmitters and each of the optical receivers,
    wherein each performance monitor comprises an optical-to-electrical converter converting an input optical signal into an electrical signal, a signal conditioning unit conditioning the electrical signal, an analog-to-digital converter, a microprocessor calculating and saving Bit Interleave Parity for each flame, a clock and data recovery unit performing clock and data recovery, a decision circuit receiving Bit Interleave Parity for each frame from the clock and data recovery unit and a saved Bit Interleave Parity for each previous frame from the microprocessor, and an error monitoring unit incrementing a counter responsive to a difference from the decision circuit between the saved Bit Interleave Parity and the received Bit Interleave Parity, and wherein each performance monitor actively monitors bit errors by calculating Bit Interleave Parity for each frame and comparing it to a calculated Bit Interleave Parity for a next frame to detect if there are one or more bits errors in a particular communication channel and Q by adjusting a decision level threshold provided by the microprocessor; and
    a diagnostic analyzer to analyze diagnostic output signals from the error monitoring unit of each performance monitor to identify at least one faulty communication channel in the single continuous communication path, and
    wherein each of the diagnostic output signals from a respective error monitoring unit indicates a number of bit errors which were produced from a first optical transmitter up to and including a the output of the corresponding optical transmitter or receiver associated with the the respective error monitoring unit; and
    wherein the diagnostic output signals enable the diagnostics analyzer to isolate bit errors in a particular communication channel of the single continuous communication path while simultaneously testing all of said optical communication channels.

2. The system of claim 1, wherein the single continuous communication path comprises three or more optical communication channels that are cascaded.

3. The system of claim 1, wherein the diagnostic analyzer is configured to analyze the diagnostic output signals from said transmitters and receivers in response to monitoring a signal quality of the bit error rate signal input to each of said transmitters and said receivers.

4. The system of claim 3, wherein each of said transmitters and said receivers is configured to monitor the signal quality of the bit error rate signal supplied by the bit error rate tester, as the bit error rate test signal is propagating on the single continuous communication path.

5. The system of claim 1, wherein the cascaded configuration comprises connections of outputs of optical receivers to inputs of optical transmitters.

* * * * *